(12) United States Patent
Paleczny et al.

(10) Patent No.: US 8,320,131 B2
(45) Date of Patent: Nov. 27, 2012

(54) ACTUATOR ASSEMBLY AND ELECTRONIC DEVICE INCLUDING SAME

(75) Inventors: Todd Robert Paleczny, Waterloo (CA); Ramon Lamers, Bochum (DE); Timothy Herbert Kyowski, Waterloo (CA)

(73) Assignee: Research In Motion Limited, Waterloo (CA)

( * ) Notice: Subject to any disclaimer, the term of this patent is extended or adjusted under 35 U.S.C. 154(b) by 216 days.

(21) Appl. No.: 12/854,286

(22) Filed: Aug. 11, 2010

(65) Prior Publication Data

US 2012/0039057 A1   Feb. 16, 2012

(51) Int. Cl.
*H05K 7/00* (2006.01)
(52) U.S. Cl. .................................. 361/728; 361/729
(58) Field of Classification Search .......... 361/728–730, 361/755
See application file for complete search history.

(56) References Cited

U.S. PATENT DOCUMENTS

| | | | |
|---|---|---|---|
| 6,313,731 B1 * | 11/2001 | Vance | 338/185 |
| 7,259,499 B2 * | 8/2007 | Askew et al. | 310/328 |
| 2006/0138903 A1 | 6/2006 | Askew | |
| 2007/0138914 A1 | 6/2007 | Ishikawa | |
| 2008/0100177 A1 | 5/2008 | Dai | |

FOREIGN PATENT DOCUMENTS

WO       03047007 A1    6/2003

OTHER PUBLICATIONS

Extended European Search Report; EP App. No. 10172548.9; Apr. 11, 2011.

* cited by examiner

*Primary Examiner* — Hung S Bui
(74) *Attorney, Agent, or Firm* — Novak Druce + Quigg LLP

(57) ABSTRACT

An actuator assembly for use in an electronic device is described. The actuator assembly includes a support tray, an actuator supported on the support tray, and a cover over the actuator and coupled to the support tray, a portion of the cover being movable relative to the support tray when the actuator is actuated.

16 Claims, 8 Drawing Sheets

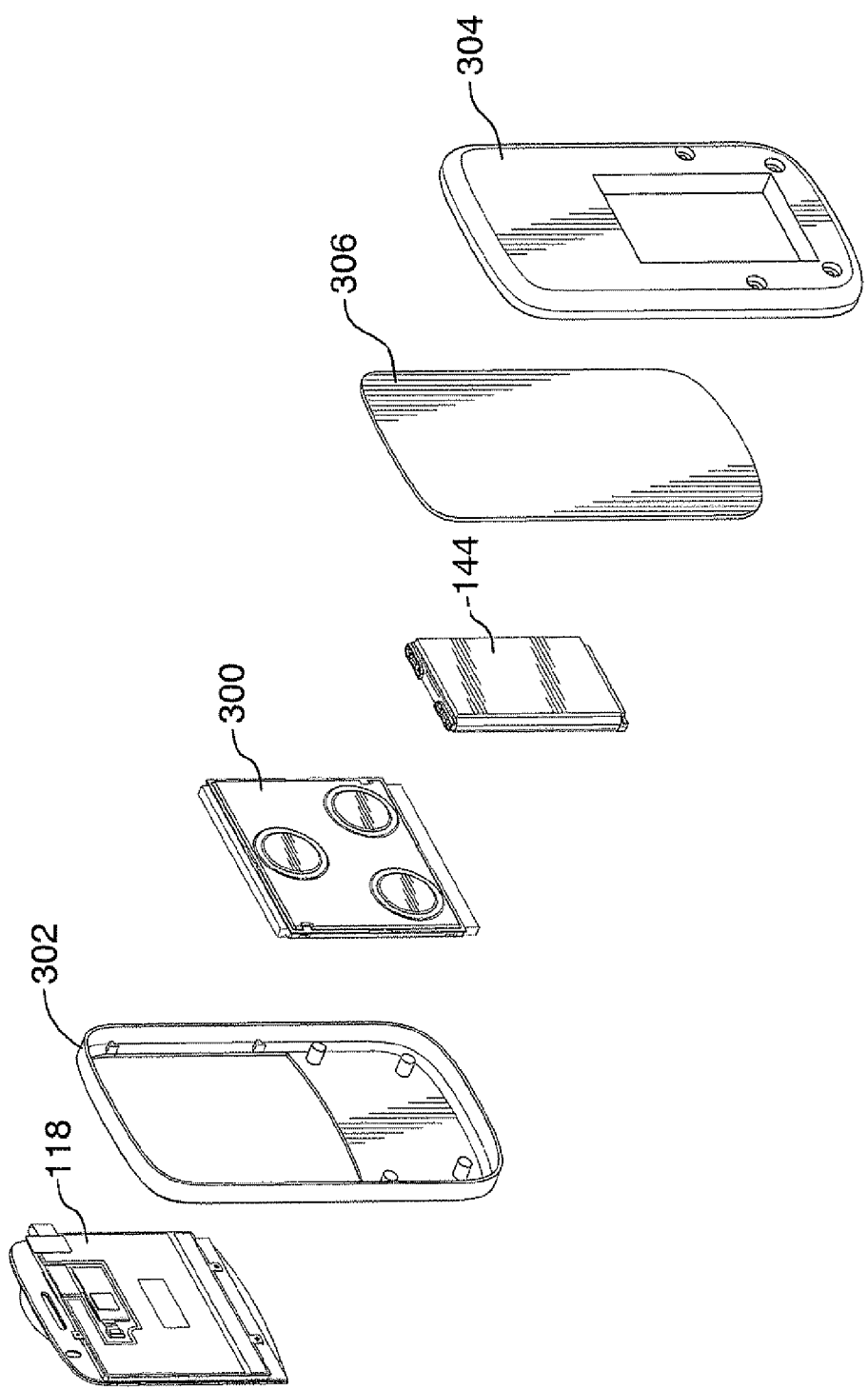

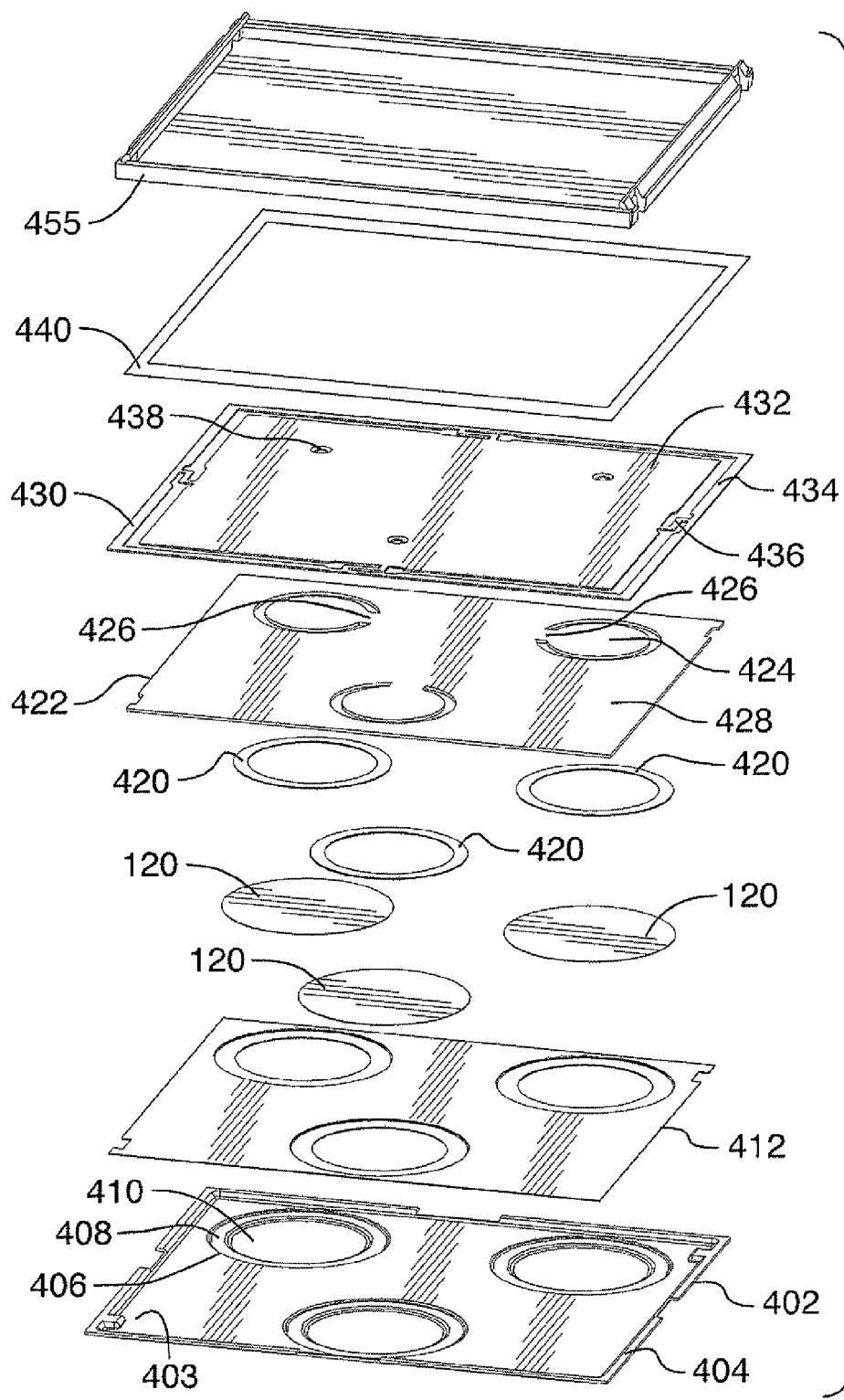

ACTUATOR ASSEMBLY AND ELECTRONIC DEVICE INCLUDING SAME

FIELD OF TECHNOLOGY

The present disclosure relates to an actuator assembly for providing tactile feedback in an electronic device that includes a touch-sensitive input device.

BACKGROUND

Electronic devices, including portable electronic devices, have gained widespread use and may provide a variety of functions including, for example, telephonic, electronic text messaging and other personal information manager (PIM) application functions. Portable electronic devices can include several types of devices including mobile stations such as simple cellular tphones, smart phones, Personal Digital Assistants (PDAs), and laptop computers.

Devices such as PDAs or smart phones are generally intended for handheld use and ease of portability. Smaller devices are generally desirable for portability. Touch-sensitive devices constructed of a display, such as a liquid crystal display (LCD), with a touch-sensitive overlay are useful on such handheld devices as such handheld devices are small and are therefore limited in space available for user input and output devices. Further, the screen content on the touch-sensitive devices can be modified depending on the functions and operations being performed.

Tactile feedback for such touch-sensitive input devices provides a positive confirmation of, for example, touch selection. The provision and control of tactile feedback in touch-sensitive devices is desirable.

BRIEF DESCRIPTION OF THE DRAWINGS

Embodiments of the present disclosure will now be described, by way of example only, with reference to the attached Figures, wherein:

FIG. 3 is an exploded view of portions of the portable electronic device of FIG. 2, including an actuator assembly in accordance with an example embodiment;

FIG. 5 is an exploded view of the actuator assembly of FIG. 4A;

DETAILED DESCRIPTION

Figure 1:
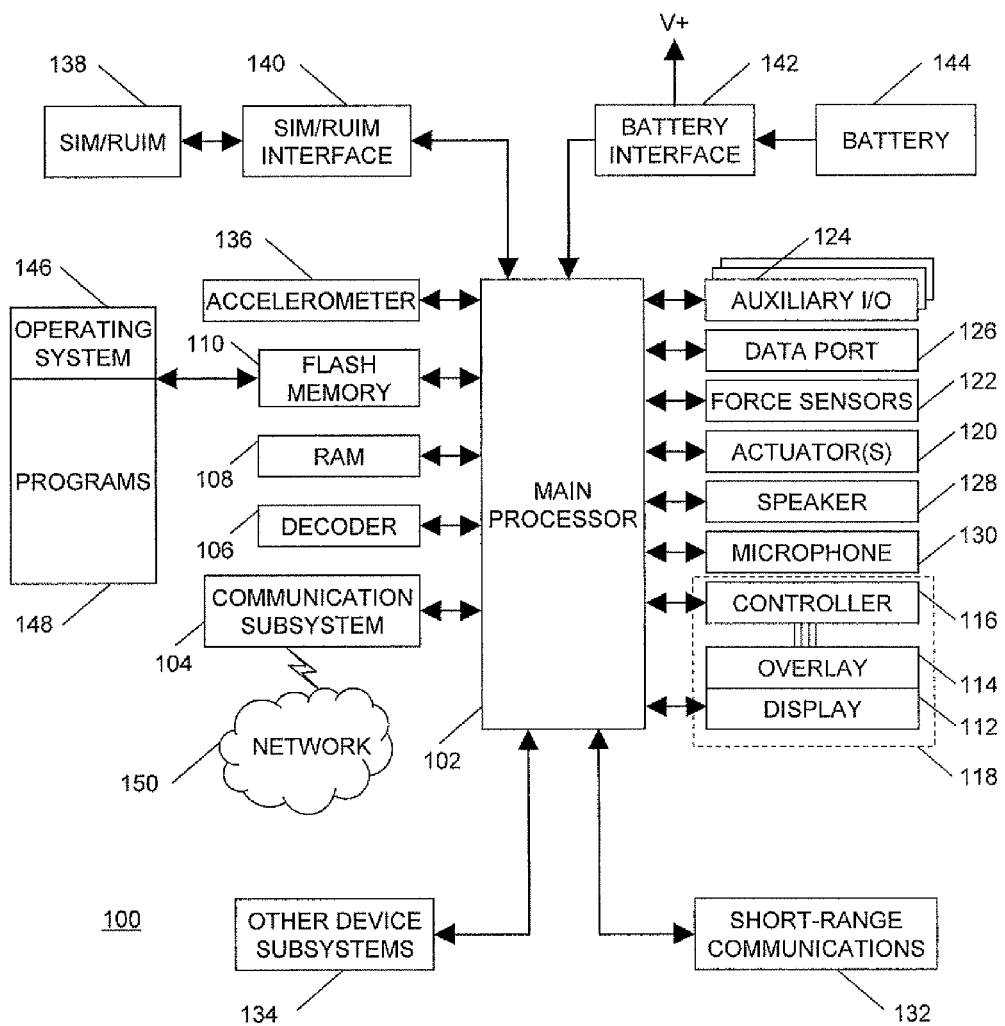
FIG. 1 is a simplified block diagram of components including internal components of a portable electronic device according to an example embodiment.

The following describes an actuator assembly for use in an electronic device. The actuator assembly includes a support tray, an actuator supported on the support tray, and a cover over the actuator and coupled to the support tray. A portion of the cover is movable relative to the support tray when the actuator is actuated.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limited to the scope of the example embodiments described herein.

The actuator assembly provides a relatively thin device to provide desirable tactile feedback, for example, to simulate actuation of a dome switch upon touching the touch-sensitive display, confirming receipt of input to the user. The tactile feedback provides a positive response and reduces the chance of input errors such as double entry, decreasing use time and increasing user-satisfaction. The actuator assembly includes a metal actuator sheet that facilitates grounding of the touch-sensitive display that is disposed on the actuator sheet. The actuator sheet facilitates pre-loading of the actuator assembly during production of the actuator assembly. The tolerance of the actuator assembly may be controlled to provide an assembly with tight tolerance as the tolerance of the entire assembly may be controlled at a lower cost by comparison to providing a low tolerance for all the individual parts.

Example embodiments of the actuator assembly described herein are adapted for use in an electronic device such as a portable electronic device that includes a touch-sensitive display. FIG. 1 shows a simplified block diagram of components including internal components of a portable electronic device according to an example embodiment.

The portable electronic device 100 includes multiple components such as a processor 102 that controls the operations of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data-centric wireless networks, voice-centric wireless networks, and dual-mode networks that support both voice and data communications over the same physical base stations. The portable electronic device 100 is a battery-powered device and includes a battery interface 142 for receiving one or more rechargeable batteries 144.

The processor 102 also interacts with additional subsystems such as a Random Access Memory (RAM) 108, a flash memory 110, a display 112 with a touch-sensitive overlay 114 connected to an electronic controller 116 that together comprise a touch-sensitive display 118, actuators 120, one or more force sensors 122, an auxiliary input/output (I/O) subsystem 124, a data port 126, a speaker 128, a microphone 130, short-range communications 132 and other device subsystems 134. User-interaction with the graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may also interact with an accelerometer 136 as shown in FIG. 1. The accelerometer 136 may include a cantilever beam with a proof mass and suitable deflection sensing circuitry. The accelerometer 136 may be utilized for detecting direction of gravitational forces or gravity-induced reaction forces.

To identify a subscriber for network access according to the present embodiment, the portable electronic device 100 uses a Subscriber Identity Module or a Removable User Identity Module (SIM/RUIM) card 138 inserted into a SIM/RUIM interface 140 for communication with a network such as the wireless network 150. Alternatively, user identification information may be programmed into the flash memory 110.

The portable electronic device 100 also includes an operating system 146 and software components 148 that are executed by the processor 102 and are typically stored in a persistent store such as the flash memory 110. Additional applications may be loaded onto the portable electronic device 100 through the wireless network 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

Figure 2:
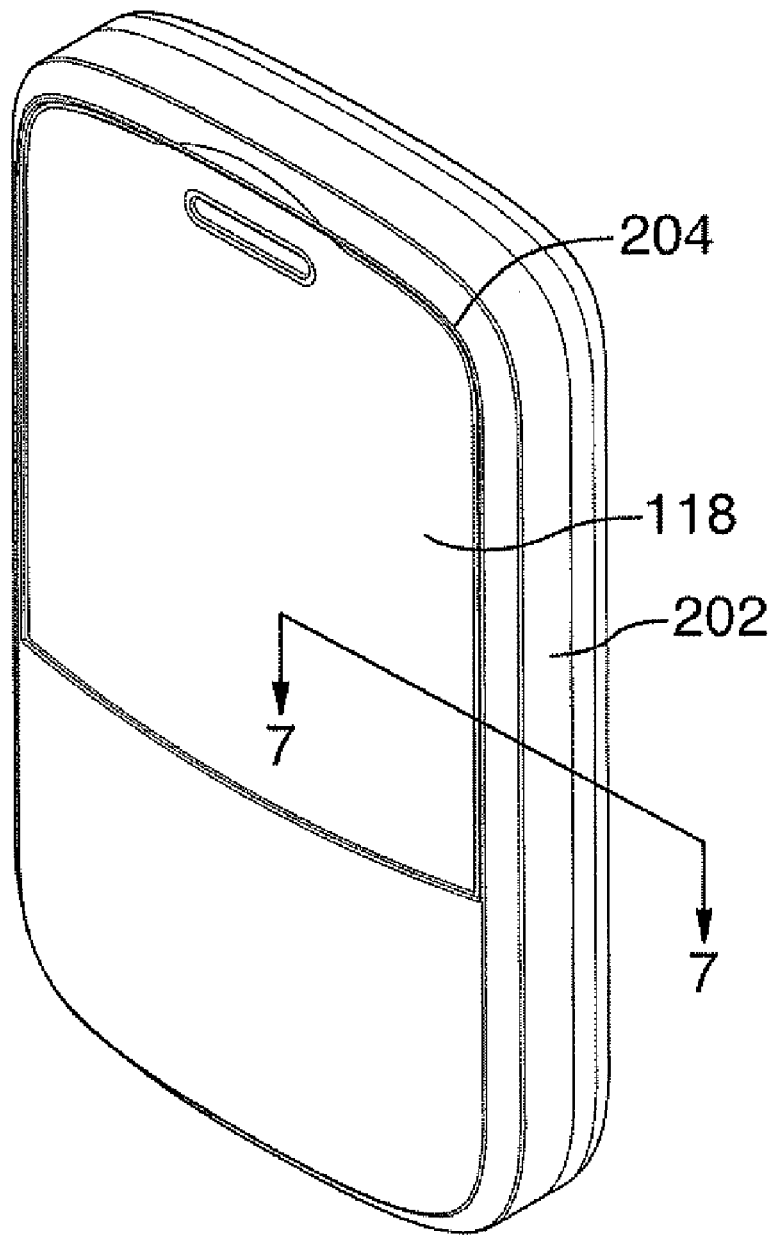
FIG. 2 is a perspective view of an example of a portable electronic device.

FIG. 2 is a perspective view of an example of a portable electronic device 100. The portable electronic device 100 includes a housing 202 that is suitable for housing the internal components shown in FIG. 1. The housing includes a frame 204 that frames the touch-sensitive display 118 for user-interaction with the touch-sensitive display 118. Although not shown in the figures, the portable electronic device 100 of FIG. 2 can further include a physical keyboard (not shown) such that the processor 102 (shown in FIG. 1) interacts with the keyboard and the housing 202 is constructed to accommodate the keys of the keyboard.

FIG. 3 is an exploded view of portions of the portable electronic device 100 including an actuator assembly 300. The housing 202 of the portable electronic device 100 includes a front 302 that includes the frame 204 and the back 304. As shown, the back 304 of the housing 202 includes an opening that may be covered by a plate that is releasably attachable to the back 304 for insertion and removal of, for example, the SIM/RUIM card 138. In the example of FIG. 3, the battery 144 is shown along with a printed circuit board 306. The touch-sensitive display 118 is disposed on the actuator assembly 300 and is available for user interaction through an opening defined the by frame 204 in the front 302 of the housing 204.

Referring now to FIG. 4A, FIG. 4B, FIG. 4C and FIG. 5, these figures show various views of the actuator assembly 300. In the presently described example embodiment, the actuator assembly 300 includes three actuators 120, which in the present embodiment are piezoelectric disk actuators. Different numbers of actuators 120 are used in other embodiments. The actuators 120 are supported by a support tray 402 that is generally rectangular in shape. The support tray 402 includes a generally flat portion 403 with a lip 404 that protrudes from one side and extends generally around flat portion 403. The lip 404 extends only partly around the flat portion 403 as a break in the lip 404 is provided at each side of the support tray 402. The breaks in the lip 404, which may be cut-out portions, are optional. These breaks may be added to increase flexibility of the actuator sheet. Alternatively, the actuator sheet can be without breaks in the lip for sealing the actuator assembly. Three pockets 406 are provided in the support tray 402 and each pocket 406 supports a respective one of the actuators 120 while facilitating movement in the form of actuation of the actuators 120. Each pocket 406 includes a step such that an annular ledge 408 is located around an inner circular depression 410. The annular ledge 408 is recessed from the flat portion 403 to provide a seat for the respective actuator 120 and the inner circular depression 410 provides a spacing between the actuator 120 and the support tray 402. The support tray 402 may be formed of metal such as stainless steel.

Figure 4A:
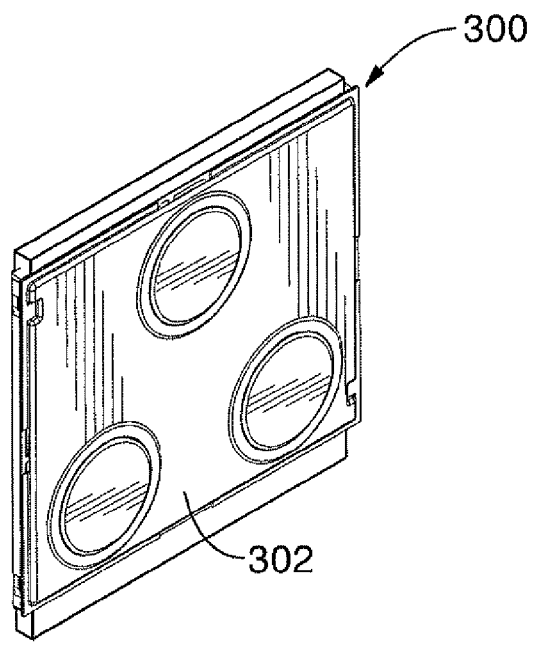
FIG. 4A is a perspective view of an actuator assembly for use in an electronic device, according to an example embodiment.
Figure 4B:
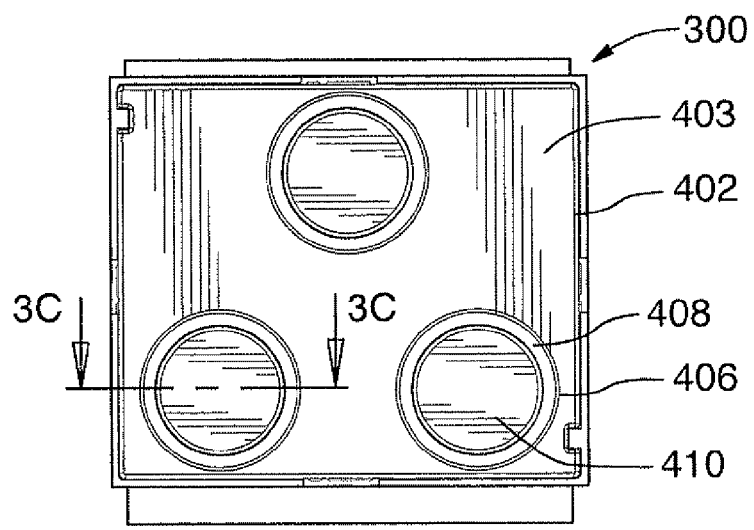
FIG. 4B is a rear view of the actuator assembly of FIG. 4A.
Figure 4C:
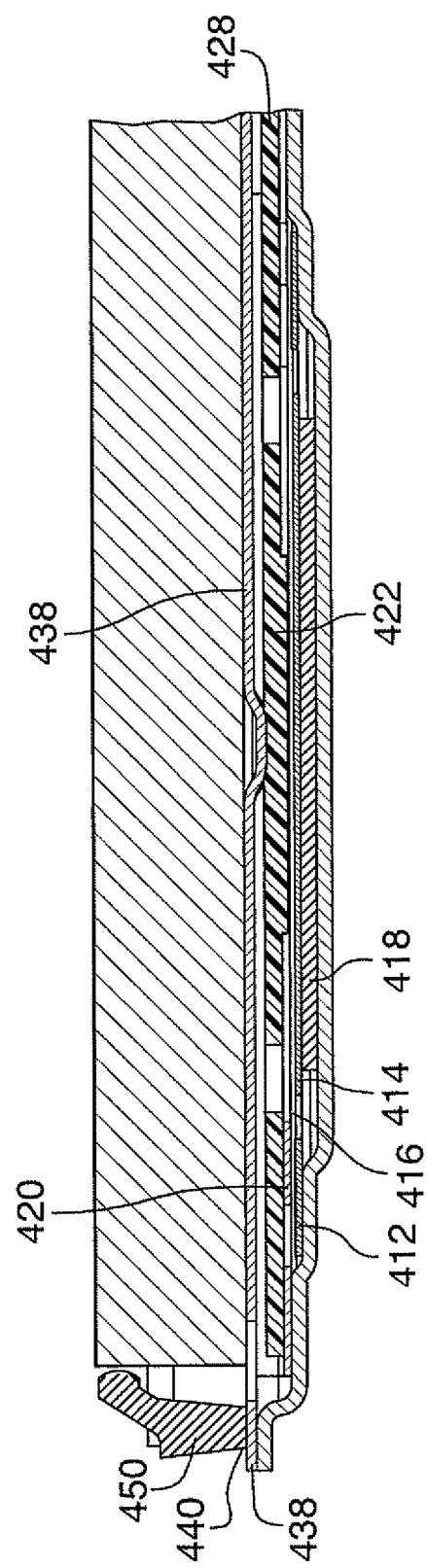
FIG. 4C is a sectional view through the line 4C-4C of FIG. 4B.

Reference is now made to FIG. 4C and to FIG. 5 which show a sectional view and an exploded view of the actuator assembly 300. A non-conductive tape 412 is disposed on the support tray 402. The non-conductive tape 412 is adhered to both the support tray 402 and the actuators 120 and electrically isolates the actuators 120 from the support tray 402. In the present example, the non-conductive tape 412 covers the entire support tray 402 with the exception of the inner circular depression 410 of each pocket 406. Thus, the non-conductive tape 412 covers the generally flat portion 403 and the annular ledge 408 of the support tray 402.

Each actuator 120 includes a piezoelectric disk such as a PZT ceramic disk 414 adhered to a metal substrate 416 of larger diameter than the piezoelectric disk 414 for bending when the piezoelectric disk 414 contracts diametrically as a result of build up of charge at the piezoelectric disk 414. The metal substrate 416 of the actuator 120 is supported on the annular ledge 408 with the non-conductive tape 412, electrically isolating the metal substrate 416 and the piezoelectric disk 414 from the support tray 402. The piezoelectric disk 414 is located in the circular depression 410 and spaced from the support tray 402 by a non-conductive cushion 418 for electrically isolating the actuator 120.

A ring of conductive tape 420 is adhered to the piezoelectric disk 414 of each actuator 120 and to a flexible printed circuit board 422. The flexible printed circuit board 422 includes conductive traces that are electrically connected to the piezoelectric disks 414 to connect the actuators 120 to, for example, the printed circuit board 306 of the portable electronic device 100. The flexible printed circuit board 422 also includes C-shaped cut-outs, with each C-shaped cut-out corresponding to a respective actuator 120 such that, at each actuator 120, a generally circular member 424 is connected by a web portion 426 to a remainder 428 of the flexible printed circuit board 422. The web portion 426 facilitates further flexing of the generally circular member 424 relative to the remainder 428 of the flexible printed circuit board 422.

Still referring to FIG. 5, an actuator sheet 430 acts as a cover to cover the flexible printed circuit board 422 and the actuators 120 and is coupled to the support tray 402. The actuator sheet 430 includes a generally rectangular inner sheet 432 inset in a larger rectangular outer ring 434. The inner sheet 432 is spaced from the rectangular outer ring 434 by an intermediate gap. The intermediate gap is interrupted by resiliently flexible arms 436 that join the inner sheet 432 to the outer ring 434. The arms 434 form a jog, such that the location at which one of the arms 434 joins the inner sheet 432 is offset from alignment with the location that the arm 434 joins the outer ring 434, to facilitate movement of the inner sheet 432 relative to the outer ring 434. The inner sheet 432, outer ring 434 and resiliently flexible arms 436 may be integral portions of a sheet and may be formed by cutting away portions to form the intermediate gap.

The inner sheet 432 includes protrusions 438 formed therein with a respective protrusion 438 extending from the inner sheet 432 toward each actuator 120 such that each protrusion 438 abuts a respective circular member 424 that abuts a respective actuator 120. In the present example, the actuator sheet 430 is a metal sheet of, for example, spring steel to facilitate grounding of the touch-sensitive display 118 that is disposed on the actuator sheet 430. The outer ring 434 is coupled to the support tray 402 by, for example, spot welding the outer ring 434 to the lip 404 of the support tray 402. Alternatively, the actuator sheet 430 may form a mechanical interlock with the support tray 402. The inner sheet 432 is movable relative to the outer ring 434 and the support tray 402 when the actuators 120 are actuated. The actuator sheet 430 facilitates pre-loading of the actuators 120 and thus, preloading of the actuator assembly 300 during production of the actuator assembly 300 such that a bending force acts on the actuators 120, and the actuators 120 provide a spring force in return, when the actuators 120 are not charged and the actuator assembly 300 is in a rest position.

A gasket 440 is disposed on the actuator sheet 430, on the outer ring 434 and a sealing element 450 is disposed on the gasket 440 for creating a seal with the housing 202 of the portable electronic device 100. The gasket 440 may include an adhesive on one side and is flexible to facilitate the spring function of the actuator sheet 430 and to seal the actuator assembly 300.

Figure 6:
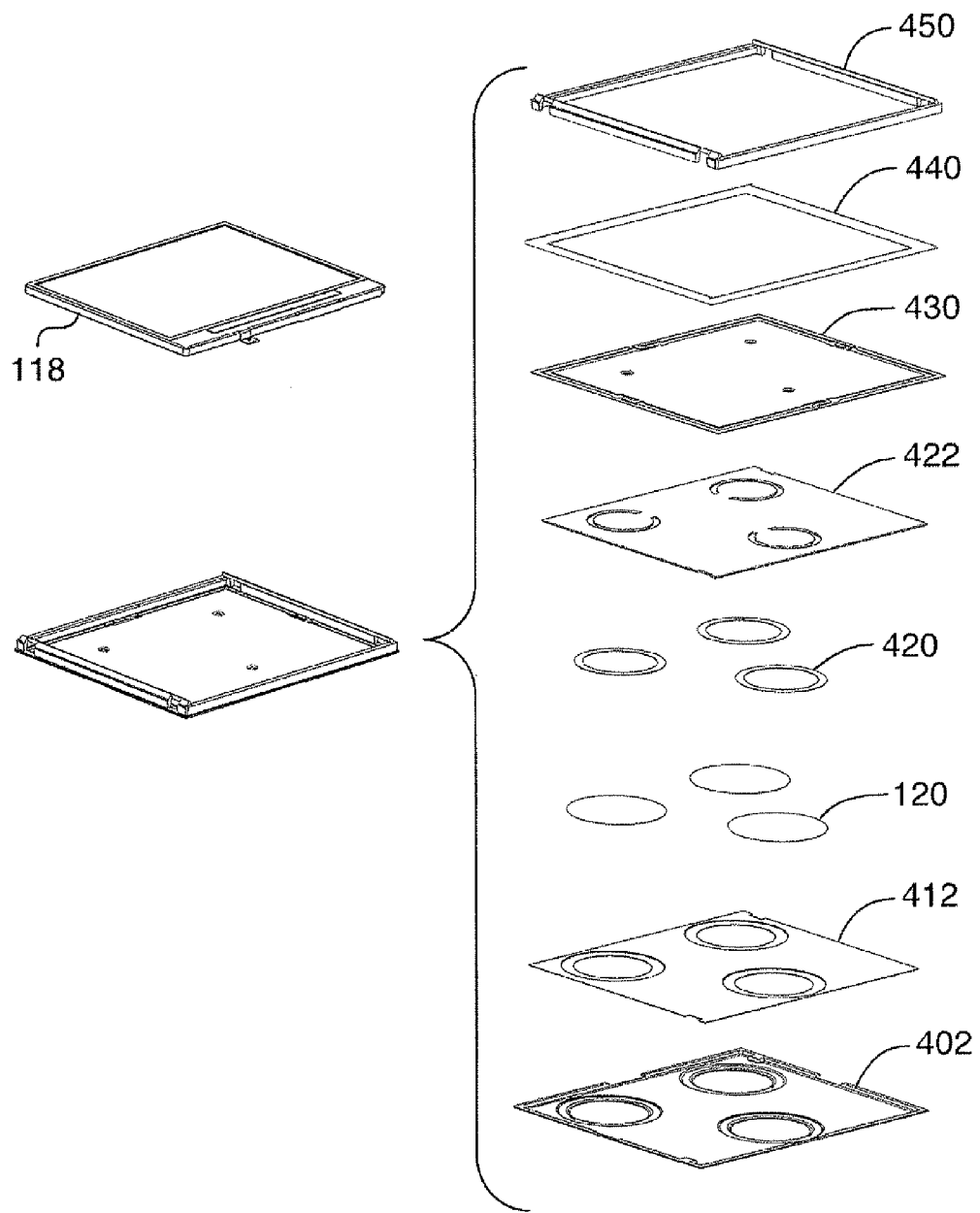
FIG. 6 is an exploded view of the actuator assembly of FIG. 4A and a touch-sensitive display.

FIG. 6 is an exploded view of the actuator assembly with a touch-sensitive display 118. The touch-sensitive display 118 is an assembly of components including the LCD display 112, the overlay 114 and controller 116 (shown in FIG. 1). The touch-sensitive display 118 is coupled to the inner sheet 432.

The touch-sensitive display 118 may be a capacitive touch-sensitive display, for example and a user's touch on the touch-sensitive display may be determined by determining the X and Y location of the touch, with the X location determined by a signal generated as a result of capacitive coupling with a touch sensor layer and the Y location determined by the signal generated as a result of capacitive coupling with another touch sensor layer. Each of the touch-sensor layers provides a signal to the controller 36 that represents the respective X and Y touch location values. Thus a feature such as a virtual button or other feature displayed on the touch-sensitive display 118 may be selected by a mapping of the touch location to a feature on the touch-sensitive display 118.

Figure 7:
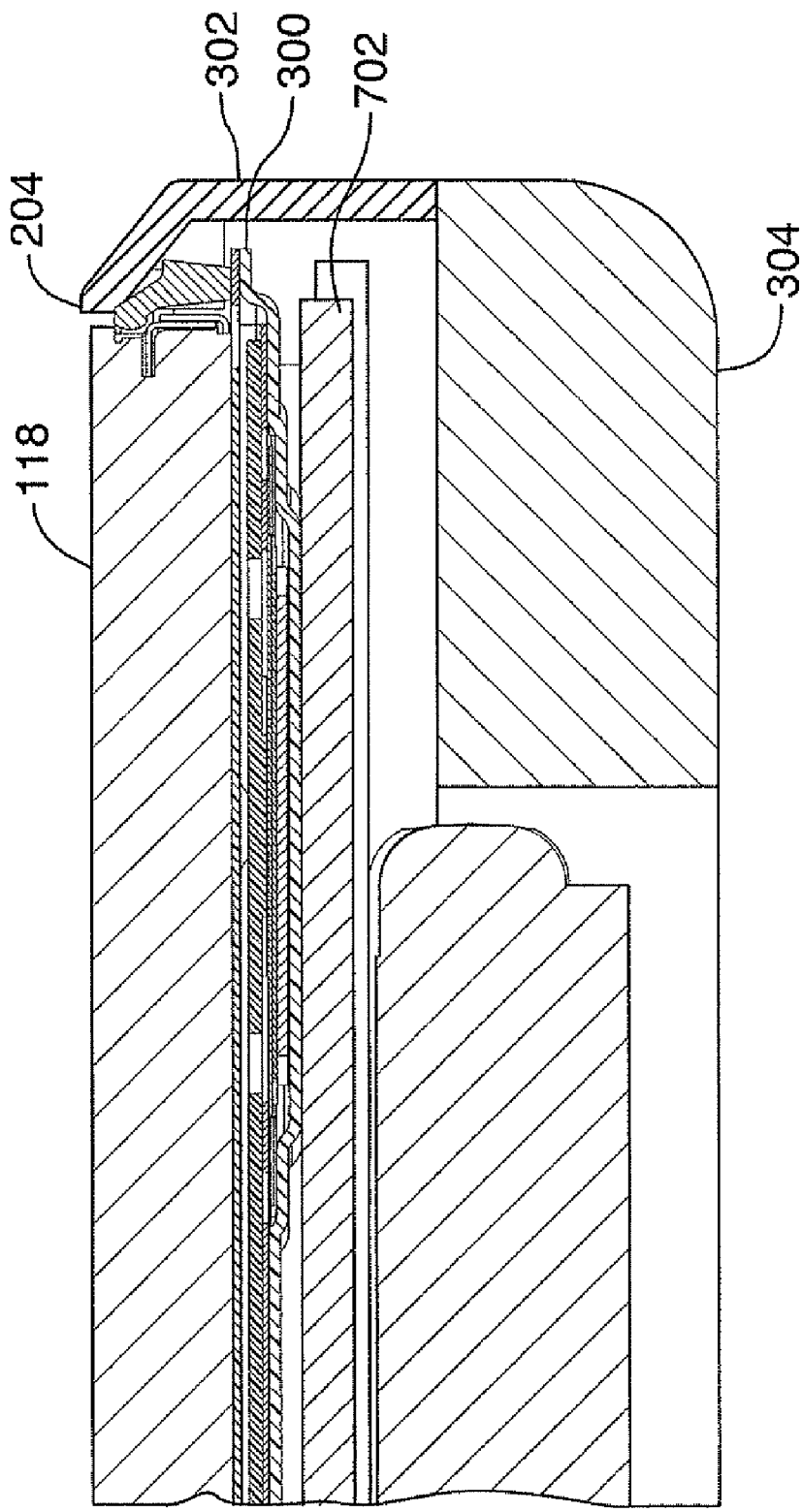
FIG. 7 is a sectional view through the line 7-7 of FIG. 2.

FIG. 7 is a sectional view through the line 7-7 of FIG. 2. As shown, the actuator assembly 300 is disposed in the portable electronic device 100, between the touch-sensitive display 118 and a base 702. The base 702 is generally rigidly supported within the portable electronic device 100 and provides a base 702 for the support tray 402. Alternatively, the support tray 402 may be included in the portable electronic device without the base. When a base is not provided, the support tray may be formed with features such as ribs or corrugations to increase rigidity.

The actuator assembly 300 acts on the touch-sensitive display 118 such that when the actuators 120 are actuated, a force is transmitted from the actuators 120, through the actuator sheet 430 and to the touch-sensitive display 118, to move the touch-sensitive display 118 relative to the base 702 and the back 304 of the housing 202 of the portable electronic device 100.

A charge applied to the piezoelectric disks 414 of the actuators 120 results in the piezoelectric disk 414 shrinking diametrically, causing the metal substrate 416 and therefore the entire actuator 120, to bend and apply a force to the inner sheet 432 of the actuator sheet 430. Because the inner sheet 432 is moveable relative to the support tray 402, the inner sheet 432 is moved away from the support tray 402 as the resiliently flexible arms 436 are flexed. The touch-sensitive display 118 is thereby moved away from the support tray 402, and thus, away from the back 304 of the housing 202 of the portable electronic device 100. The removal of the charge, causes the actuators 120 to return to the rest position and the resiliently flexible arms 436 facilitate movement of the inner sheet 432 to return to the rest position. Thus, the touch-sensitive display 18 is moved back to the rest position. The actuators 120 are connected through the flexible printed circuit board 416 to, for example, the printed circuit board 306 of the portable electronic device 100 and may be controlled by drive circuitry connected to the processor 102 or other microprocessor.

The mechanical work performed by the actuators 120 may be controlled to control the force and movement of the touch-sensitive display 118, for example, in response to detection of a touch. Alternatively, force sensors may be included as part of the actuator assembly 300 or external to the actuator assembly to measure an applied force by a user touch on the touch-sensitive display 118 and the actuators 120 may be controlled to provide movement of the touch-sensitive display 118 in response to detection of an applied force on the touch-sensitive display 118. Fluctuations in mechanical work performed as a result of, for example, temperature, may be reduced by modulating the current to the actuators 120 to control the charge. An increase in the charge increases the force on the touch-sensitive display 118 away from the support tray 402 and a decrease in the charge decreases the force on the touch-sensitive display 118, facilitating movement of the touch-sensitive display 118 toward the base 82. In the present example embodiment, each of the actuators 120 is controlled equally and concurrently. It will be appreciated that the piezoelectric actuators can be controlled separately, however. The portable electronic device 100 is controlled generally by modulating a force on the touch-sensitive display 118 to cause movement of the touch-sensitive display 118 relative to the support tray 402 of the portable electronic device 100 in response to detection of a touch.

The embodiments shown and described herein illustrate examples only and many modifications may be made. For example, the number of actuators may differ. In one example, four actuators are located near respective corners of the actuator assembly.

An actuator assembly is provided for use in an electronic device. The actuator assembly includes a support tray, an actuator supported on the support tray, and a cover over the actuator and coupled to the support tray, a portion of the cover being movable relative to the support tray when the actuator is actuated.

An electronic device includes a housing, a touch-sensitive input device exposed by the housing, and an actuator assembly. The actuator assembly is housed in the housing and coupled to the touch-sensitive input device.

The actuator assembly provides a relatively thin device to provide desirable tactile feedback, for example, to simulate actuation of a dome switch upon touching the touch-sensitive display, confirming receipt of input to the user. The tactile feedback provides a positive response and reduces the chance of input errors such as double entry, decreasing use time and increasing user-satisfaction. Further, the actuator assembly includes a metal actuator sheet that facilitates grounding of the touch-sensitive display that is disposed on the actuator sheet. The actuator sheet facilitates pre-loading of the actuator assembly during production of the actuator assembly. Furthermore, the tolerance of the actuator assembly may be controlled to provide an assembly with tight tolerance as the tolerance of the entire assembly may be controlled at a lower cost by comparison to providing a low tolerance for all the parts individually.

While the embodiments described herein are directed to particular implementations of the actuating assembly and the portable electronic device and the, it will be understood that modifications and variations may occur to those skilled in the art. All such modifications and variations are believed to be within the sphere and scope of the present disclosure.

What is claimed is:

1. An actuator assembly for use in an electronic device, the actuator assembly comprising:
    a support tray;
    an actuator supported on the support tray; and
    a cover over the actuator and coupled to the support tray, the cover including first and second portions connected by a flexible connection, the first portion coupled to the support tray and the second portion being movable relative to the support tray when the actuator is actuated.

2. The actuator assembly according to claim 1, wherein the actuator comprises a piezoelectric actuator.

3. The actuator assembly according to claim 2, wherein the actuator comprises a piezoelectric disk actuator.

4. The actuator assembly according to claim 1, wherein the actuator comprises a plurality of piezoelectric disk actuators.

5. The actuator assembly according to claim 4, wherein the support tray includes a depressions in the tray at which the piezoelectric disk actuators are supported.

6. The actuator assembly according to claim 5, wherein the piezoelectric disk actuators are coupled to the support tray by a non-conductive adhesive.

7. The actuator assembly according to claim 1, comprising a printed circuit board disposed between the support tray and the cover.

8. The actuator assembly according to claim 7, wherein the printed circuit board is a flexible printed circuit board.

9. The actuator assembly according to claim 8, wherein the flexible printed circuit board is disposed between the actuator and the cover.

10. The actuator assembly according to claim 9, wherein the flexible printed circuit board is connected to the actuator to provide an electrical connection for controlling the actuator.

11. The actuator assembly according to claim 1, wherein the first and second portions are connected by spring arms.

12. The actuator assembly according to claim 11, wherein the second portion covers the actuator and is inset within the first portion.

13. The actuator assembly according to claim 12, wherein the spring arms comprise thin portions of metal connecting the first and second portions.

14. The actuator assembly according to claim 12, wherein the first portion is welded to the support tray.

15. The actuator assembly according to claim 1, comprising a sealing element adhered to the cover for sealing with a housing of the electronic device.

16. An electronic device comprising:
    a housing;
    a touch-sensitive input device exposed by the housing; and
    an actuator assembly comprising a support tray, an actuator supported on the support tray, and a cover over the actuator, the cover including first and second portions connected by a flexible connection, the first portion coupled to the support tray and the second portion being movable relative to the support tray when the actuator is actuated.

* * * * *